(12) United States Patent
Cadet et al.

(10) Patent No.: US 6,732,545 B2
(45) Date of Patent: *May 11, 2004

(54) SILICA STRUCTURE CRACK MONITORING

(75) Inventors: Gardy Cadet, Orange, NJ (US); Thomas E. Stockert, Millburn, NJ (US); Victor M. Lubecke, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 194 days.

This patent is subject to a terminal disclaimer.

(21) Appl. No.: 09/852,420

(22) Filed: May 10, 2001

(65) Prior Publication Data

US 2002/0184917 A1 Dec. 12, 2002

(51) Int. Cl.⁷ .................................................. C03B 8/02
(52) U.S. Cl. ..................... 65/17.2; 65/29.18; 65/395; 65/396; 273/587; 273/598; 273/600
(58) Field of Search ................... 65/17.2, 29.18, 65/395, 396; 273/587, 600, 598

(56) References Cited

U.S. PATENT DOCUMENTS

| | | | | |
|---|---|---|---|---|
| 5,493,511 A | * | 2/1996 | Wincheski et al. | ............ 702/39 |
| 5,710,432 A | * | 1/1998 | Bell | ...................... 250/559.32 |
| 6,008,657 A | * | 12/1999 | Suyama et al. | .............. 324/639 |
| 6,062,083 A | * | 5/2000 | Dunegan | ...................... 73/587 |
| 6,324,912 B1 | * | 12/2001 | Wooh | .......................... 73/629 |
| 2002/0121140 A1 | * | 9/2002 | Cadet et al. | ................... 73/587 |

* cited by examiner

*Primary Examiner*—Sean Vincent

(57) ABSTRACT

Disclosed are silica structure crack detection methods and apparatuses particularly useful in sol-gel fabrication processes. A wave signature of a crack in the silica structure is sensed to indicate that cracking has occurred. Sensing may be by active or passive techniques and may include contact and non-contact methods of monitoring.

Further disclosed is a silica structure fabrication process development method wherein cracks are monitored by sensing a wave signature of a crack to isolate a process step or steps in which cracking has occurred. Process parameters are then adjusted in the isolated step to diminish or eliminate cracking.

13 Claims, 12 Drawing Sheets

FIG. 3
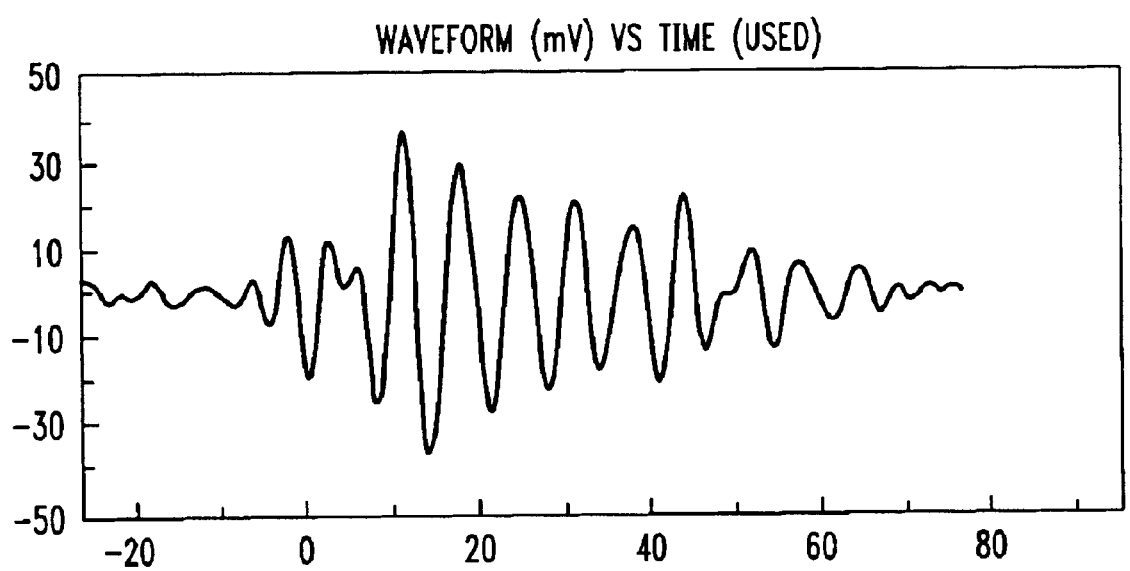
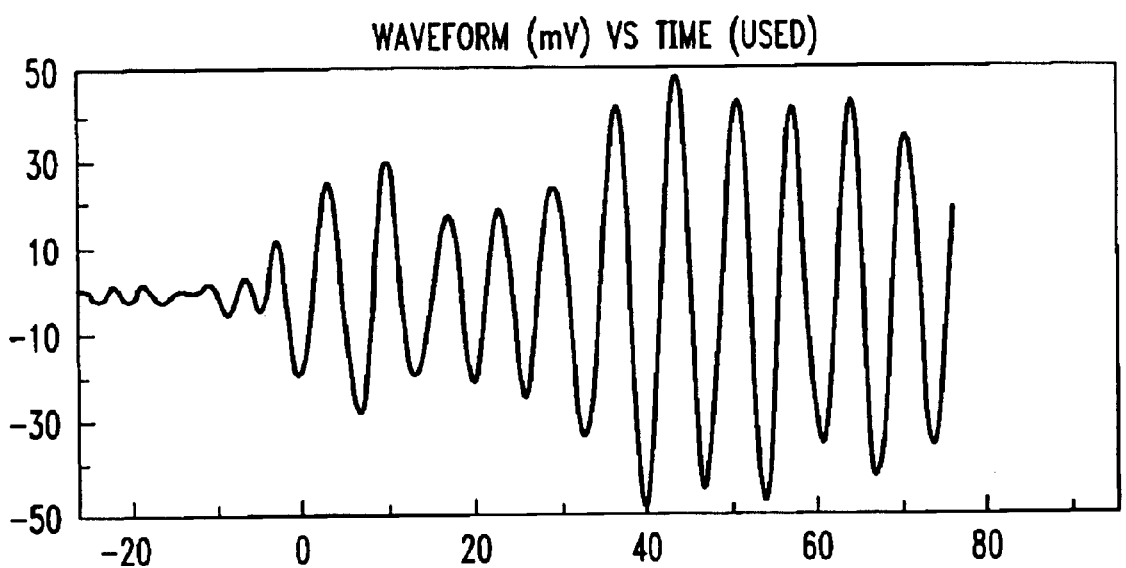

CHANNEL 1

CHANNEL 2

CHANNEL 3

WAVEFORM (mV) VS TIME (USED)

WAVEFORM (mV) VS TIME (USED)

SILICA STRUCTURE CRACK MONITORING

FIELD OF INVENTION

The invention relates to sol-gel structure fabrication and more particularly to monitoring of cracks during a sol-gel tube fabrication process.

BACKGROUND OF THE INVENTION

Sol-gel tubes are formed as precursors to optical fibers. As demand for optical fiber continues to escalate, improved diagnostic and process monitoring tools are desirable to increase sol-gel tube manufacturing yield. In particular, it is advantageous to monitor processes for sol-gel tube cracking.

Indirect measurement of process conditions such as temperature, humidity and gas flow as is currently done, often does not provide accurate correlation of such conditions with tube cracking.

Existing scanning and imaging techniques have limited value in detecting cracks. Scanning methods such as laser ultrasonic techniques, and spectroscopic methods such as infrared and UV-visible techniques are slow and difficult to implement. Imaging of tubes to monitor cracking using a camera requires highly sophisticated imaging software.

Acoustic emission monitoring has been used to detect large scale movement such as in security system motion sensors. Detection of small scale material movement, such as occurs during sol-gel tube cracking, by acoustic emission monitoring is not presently employed.

Because acoustic emission from cracking arises from unpredictable locations at random times and with an unanticipated waveform involving a relatively broadband of frequencies, it is much more difficult to analyze than conventional well-characterized ultrasonic pulses commonly used in nondestructive testing. Despite innumerable measurements of acoustic emission signals from a variety of sources, their waveforms and frequency spectra, the prediction of a failure mode based on information provided by acoustic emission, has proven difficult in the past.

Sol-gel formation process temperatures may reach higher than 1000° C. These high temperatures limit in situ monitoring of sol-gel tubes during the formation process. This is problematic because the sol-gel tube formation process typically spans a 48 hour period, making it difficult to isolate a process step or steps during which problems such as cracking occur.

Accordingly, there is a need for improved crack detection in sol-gel tubes.

SUMMARY OF THE INVENTION

Embodiments of the invention provide silica structure crack detection methods and apparatuses particularly useful in sol-gel fabrication processes. A wave signature of a crack in the silica structure is sensed to indicate that cracking has occurred. Sensing may be by active or passive techniques and may include contact and non-contact methods of monitoring.

Further disclosed is a silica structure fabrication process development method wherein cracks are monitored by sensing a wave signature of a crack to isolate a process step or steps in which cracking has occurred. Process parameters are then adjusted in the isolated step to diminish or eliminate cracking.

DESCRIPTION OF THE DRAWINGS

The invention is best understood from the following detailed description when read with the accompanying drawings.

FIG. 3 depicts spectra of a cracked sol-gel tube.

DETAILED DESCRIPTION OF THE INVENTION

Disclosed are methods and apparatuses for monitoring cracks in a silica structure wherein a wave signature of a crack in the silica structure is sensed. The signature is defined as the unique characteristics of a structure in a particular mode that make it identifiable by a monitoring system. The wave signature may be characterized by the presence of electromagnetic energy, acoustic energy or a combination thereof. Detection maybe by passive or active monitoring. Passive monitoring is sensing signals originating from a structure. Active monitoring is sensing changes in a signal caused by the interaction of a structure with the signal. For active monitoring the sensor may have contact with the silica structure or may receive signals through one or more intermediate structures or materials. The latter type of active monitoring will be hereinafter referred to as a "non-contact" mode.

Embodiments of the invention allow direct measurement of cracking in drying structures, and may provide real-time determination of a failure mode mechanism in the fabrication process.

The inventive methods and devices are particularly applicable to sol-gel tube fabrication processes. Therefore, for simplicity, embodiments of the invention will be described as they relate to sol-gel tubes. Those skilled in the art, however, will understand that the invention is applicable to monitoring of other structures.

Passive monitoring methods may offer several benefits over traditional crack detection techniques. Because the signal has its origin from the material itself, the structure need not be interrogated to obtain information regarding structural integrity. Interrogating the gel with a voltage pulse, for example, can interfere with the drying dynamics of the gel structure. Additionally, passive monitoring allows substantially all portions of the structure to be inspected simultaneously. Therefore, it is not necessary to scan the wave beam, looking for local defects.

Figure 1:
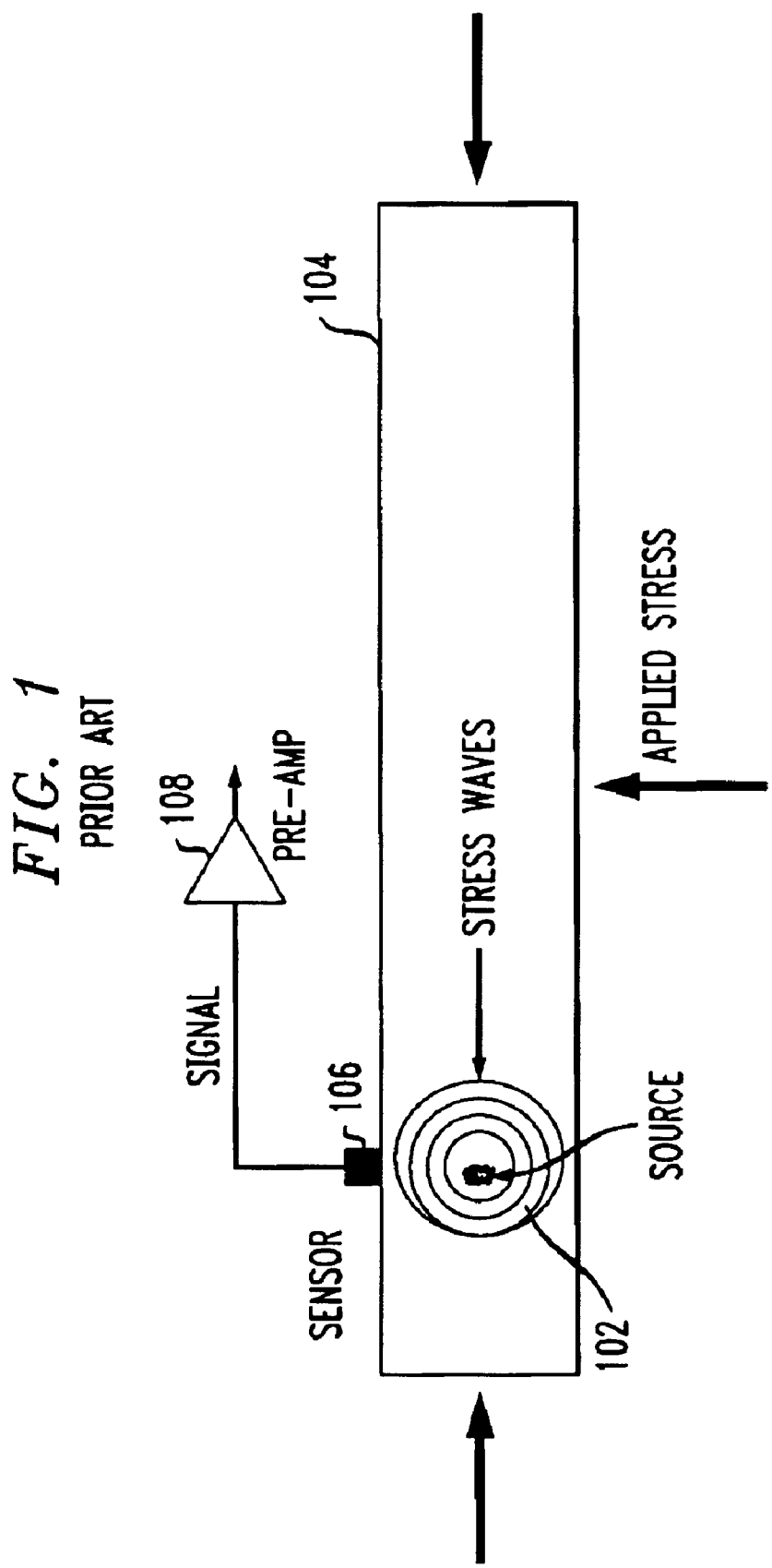
FIG. 1 depicts the principle of acoustic emission as known in the art.

Passive monitoring of acoustic emissions is particularly applicable to crack detection in silica structures such as, for example, sol-gel tubes. Acoustic emission may be described as the relaxation of a stress field within the material that radiates energy in the form of acoustic waves. This phenomenon occurs in a very wide range of materials or structures. The largest scale acoustic emissions are seismic events such as an earthquake, while the lowest scale processes are the movements of small numbers of dislocations in stressed materials such as metals. Somewhere in between falls the cracking of sol-gel overdladding tubes in low temperature dryers. The principle for detecting acoustic emission signals, which is known in the art, is shown in FIG. 1. Stress waves 102 produced by the movement of material 104 following the release of elastic stress, constitute acoustic emissions. The acoustic emissions may be detected by a sensor 106 and amplified by a pre-amp 108.

The sources of the acoustic signals may be defects related to deformation such as crack nucleation, voids and inclusions. Defects and flaws may occur as a consequence of poor material processing and may upset the mechanical balance that gives composites or gel bodies their high performance. Transient stress waves released from micro-structural alteration induced in the material may provide warning of impending material failure.

Acoustic emission activity can be very complex and typically requires detailed and elaborate signal processing to be able to extract relevant information. Embodiments of the invention, however, allow the determination of cracks during sol-gel processing, more specifically during the drying stage of the sol-gel process, without the precise details of the source location, thereby simplifying the analysis. The magnitude of the signal set up by a threshold is sufficient to characterize the crack. Techniques of the invention maybe implemented using only a narrow band resonance sensor to measure a few features of the received waveform and to process the information from the source event. In an exemplary embodiment the sensor comprises a transducer with a center frequency of about 150 kHz with a band width of less than about±20 kHz.

Taking into account particular considerations may optimize the acoustic emission measurement. First, wet gel leads to high sound absorption. One needs to determine a window in time when the gel is strong enough to support and transport low frequency acoustic waves. In addition, when the gel structure is wet, it is less likely to crack. Second, the measurement cycle may be reduced by establishing a window in time when it is most appropriate or beneficial to monitor for cracks. Noisy environments for example, from pumps, fans, and gas flow, may contribute to potential interference and hinder crack detection.

Figure 2A:
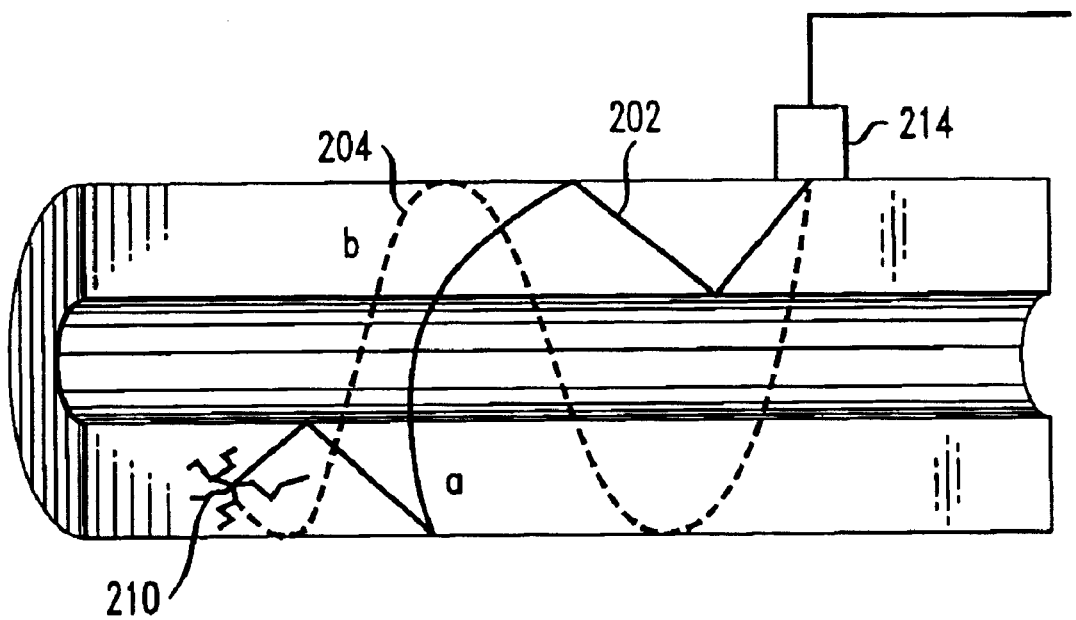
FIGS. 2a-b depict a few possible paths by which acoustic waves from a cracked sol-gel tube can reach a transducer.
Figure 2B:
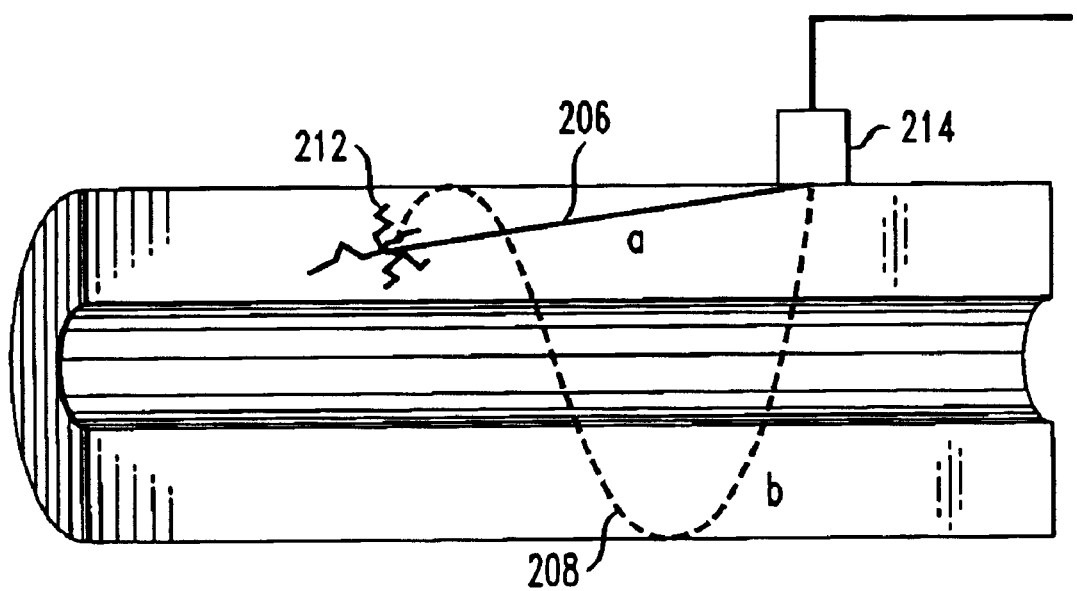

Traditional acoustic emission technology accepts the waveform in its entirety. A first part of the acoustic emission waveform is used to characterize the source location and a later part is made up of many components reaching the sensor by a variety of paths. FIGS. 2a and b demonstrate just a few of the possible paths 202, 204, 206, and 208, by which the wave from cracks 210 and 212 within a tube can reach a sensor 214. The sensor response will be a combination of these waves. At the onset of a crack, the acoustic emission wave bounces around the tube, repeatedly exciting the sensor until the wave decays away. This decay process in the case of a sol-gel tube takes tens of milliseconds—much longer than the source event, which usually finishes in a few microseconds or less.

Spectra of a cracked sol-gel tube are shown in FIG. 3. The spectra represent the change in voltage over time. Typically, the highest peak in the waveform is produced, not by the first component, but by the constructive interference of several of the later components reaching the sensor.

The shape of the received waveform is fundamentally the result of the wave propagation processes discussed above. Two other important aspects of wave propagation in typical acoustic emission testing are attenuation and wave velocity. Attenuation in particular is an important parameter in evaluating the performance of the acoustic generated sound waves. Often, the intensity of the signal produced by the cracked tube will not reach the detector due to absorption of the sound in the material itself. Attenuation governs detectability at a distance, and is therefore, an important factor in choosing sensor position and spacing on the gel structure. Attenuation of sound by absorption depends on the material and frequency used. The absorption is specified by the coefficient $\alpha$ which governs the variation in the amplitude A with distance:

$$A_x = A_o e^{-\alpha x} \tag{1}$$

in which $A_o$ is the initial amplitude and e is the base natural logarithm.

The intensity decreases as a function of distance in accordance with, $$I_x = I_o e^{-\alpha x} \tag{2}$$

wherein $A_x$ and $I_x$ are measurements of sound wave amplitude and intensity, respectively, at two points $x_1$ and $x_2$. Equations 1 and 2 may be combined to determine the absorption coefficient as $$\alpha = (1/(x_2-x_1)) \ln A_1/A_2 \tag{3}$$

or $$\alpha = (1/(x_2-x_1)) \ln I_1/I_2 \tag{4}$$

The intensity of a sound wave diminishes in the inverse proportion to the square of the distance from the source, i.e.

$$I \sim 1/d^2 \tag{5}$$

where d is the distance from the source. Therefore, this relationship should be given consideration when choosing the position of the transducer on the sol-gel structure.

The structure of a solid material has a marked effect on the absorption of sounds. An ideal homogeneous and elastic solid would cause no losses. Such a solid is not known to exist. There is always some loss by conversion into heat from internal friction and thermal conduction or loss from scattering. The absorption mechanism also depends on particle size with small sizes experiencing a substantially uniform pressure. The attenuation of longitudinal and shear waves in solids is described by $$\alpha = Af + Bf^4 \tag{6}$$

where $Bf^4$ represents the scattering by particles very small relative to the wavelength $\lambda$ (Rayleigh scattering). $Af$ represents the relative hysteresis observed in most solids at low frequencies. A and B are constants, depending on wave type and properties of the materials. Equation 6 is accurate, provided that the wavelength is at least 10 times the grain size.

The frequency of the generated sound wave is broadband. In an exemplary embodiment of the invention, a resonance transducer in the frequency range on the order of 150 kHz is used, whose wavelength is many orders of magnitude greater than the grain size in the sol-gel material, thereby maximizing the efficiency for detecting the generated sound waves. In addition, this frequency range is much above the audible frequency where noise from pumps, flowing gas streams and tube rotation can interfere. This provides an improved signal to noise ratio.

According to embodiments of the invention, acoustic or electromagnetic emission signal intensity can be used to identify gross cracks based on calibration models developed particularly for sol-gel tubes. In this way, acoustic or electromagnetic emission becomes a very powerful technique that can be used to detect and determine when a tube has cracked based on the level of the detected acoustic emission signal. Depending on the level of signal generated, acceptance or rejection of the tube can be made based on the acoustic or electromagnetic emission inspection alone.

Figure 4:
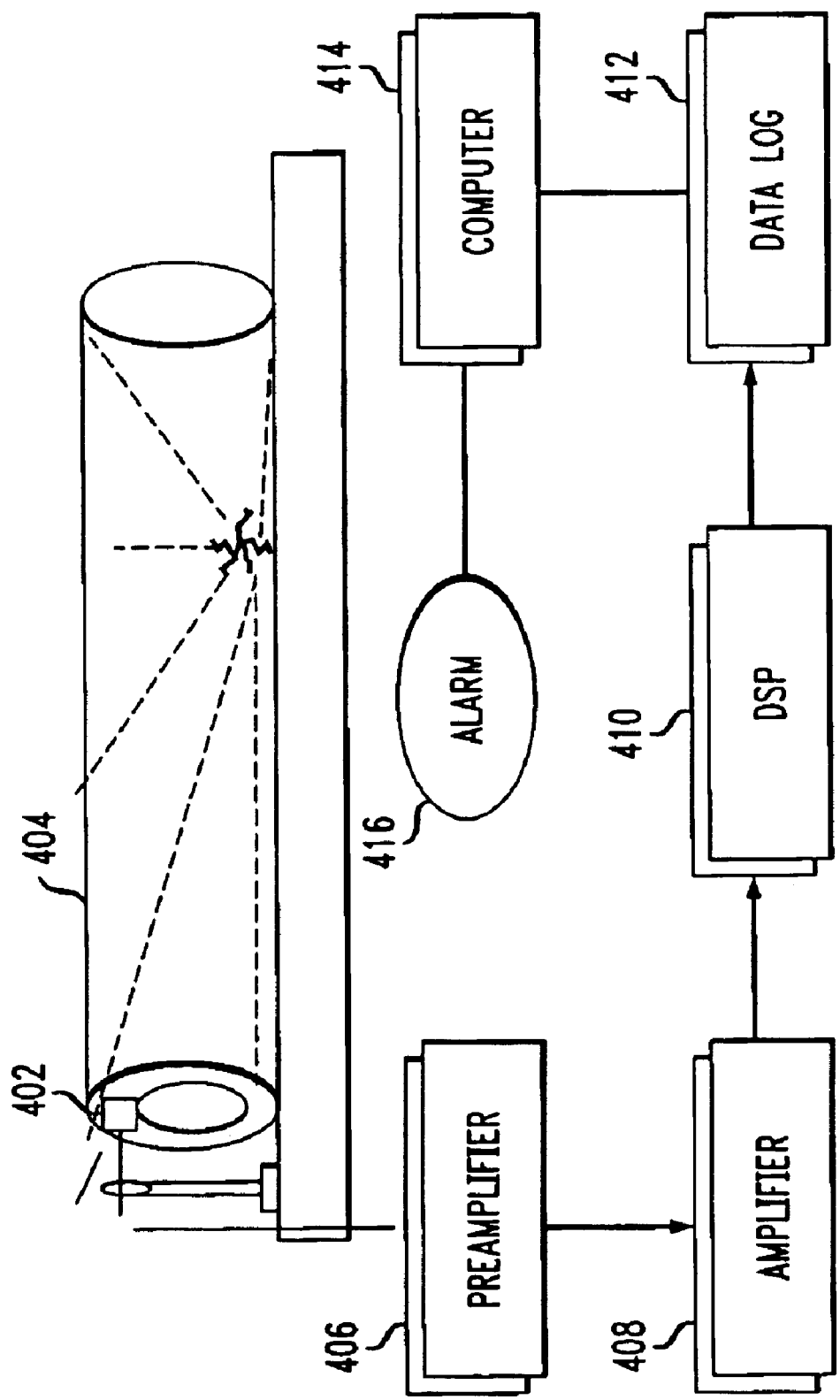
FIG. 4 depicts an acoustic emission signal measurement system according to an illustrative embodiment of the invention.

FIG. 4 depicts a signal measurement and processing acoustic emission system according to an illustrative embodiment of the invention. To measure acoustic emission signals, a transducer 402 is attached to a structure 404 to be analyzed. In an exemplary embodiment, transducer 402 is a piezoelectric transducer. The signal, typically in the micro to milli-volts range, is amplified by pre-amplifier 406 before it is sent to an amplifier 408 that may filter and shape the signal. In an illustrative embodiment, amplifier 408 is a wideband-conditioning amplifier. The signal is then sent to a digital signal processing board 410 where it is pulse analyzed. A threshold-arming technique may be used to signal when an event has occurred based on the level of the acoustic emission generated signal. Finally, the data is logged by data logger 412 into a computer 414. An alarm 416 may be incorporated into the system to provide audio or visual warning of a cracking event. Automatic process interrupts may also be triggered. Statistical analysis software may be used to map in real time, events associated with a particular tube, providing a means for predicting tube failure in subsequent steps of the sol-gel process.

Embodiments of the invention include active monitoring techniques. These include detection of reflected signals characterized by a wave signature indicating a crack. Such embodiments may include, for example, radar or sonar or other signal reflecting techniques.

In an illustrative embodiment, a Doppler radar technique is used. The radiation source and receiver (together "sensor") may be positioned outside of a window, protecting the sensor from the process environment, and thus allowing monitoring even at very high temperatures.

Figure 10:
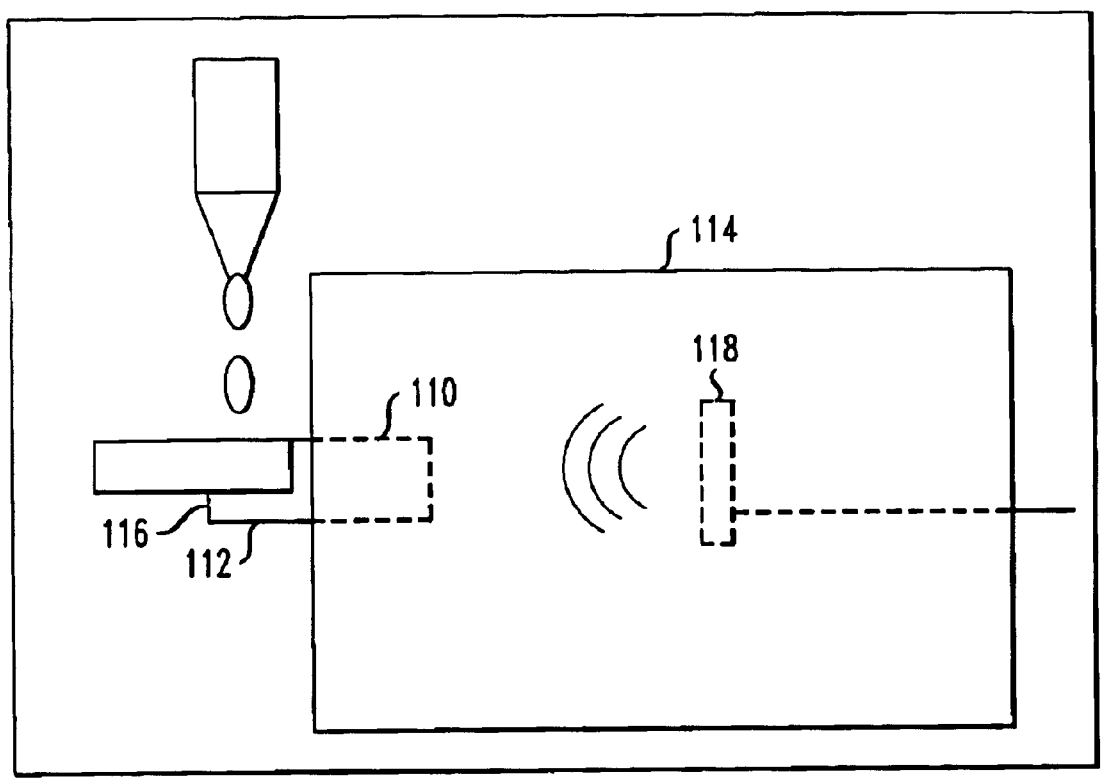
FIG. 10 depicts an experimental set-up used to demonstrate illustrative embodiments of the invention.

Advantageously the technique may easily be implemented in high temperature environments where contact sensors are impractical. FIG. 10 depicts an experimental set-up used to demonstrate the use of Doppler radar to remotely detect cracks during a sol-gel formation process. A first end 110 of a sol-gel tube 112 is inserted into an absorber-lined box 114. A second end 116 of sol-gel tube 112 protrudes from box 114. Box 114 is absorbent-lined to confine signals to the box. A 10 GHz Doppler radar motion sensor 118 is positioned within box 118, approximately three to four inches from end 110 of sol-gel tube 112. The optimum distance may vary depending on set-up parameters such as sensor specifications and tube size. The sensor frequency need not be 10 GHz. An illustrative example includes frequencies in the range of about 1 GHz to about 20 GHz. The transmitting and receiving portions of the sensor may be separate components or included in a single device.

A signal, preferably continuous, is transmitted from sensor 118 to sol-gel tube 112 and reflected by sol-gel tube 112 back to sensor 118. The output of sensor 118 is measured which is a voltage proportional to the signal characteristic change between the transmitted and received signals. Internal or external movement of the sample and/or corresponding fluid activity, including microscopic motion, result in a corresponding characteristic shift in the reflected signal, and thus the output is a measure of the magnitude of the generated crack. In an exemplary embodiment of the invention, a single frequency is monitored and evaluated to determine whether a frequency shift has occurred between the transmitted and received signals. Although microwaves have been used to experimentally demonstrate the crack detection technique, radio waves or millimeter waves may also provide satisfactory results.

Figure 11:
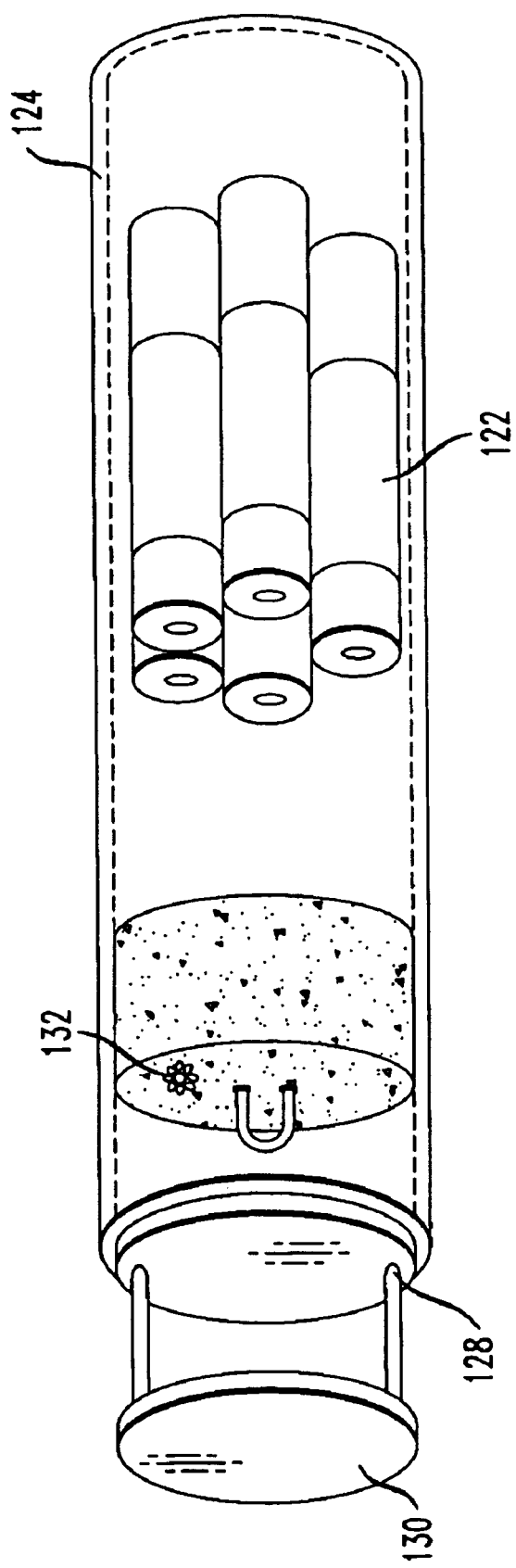
FIG. 11 depicts a crack detector according to an illustrative embodiment of the invention.

FIG. 11 depicts a portion of a crack detector according to an illustrative embodiment of the invention. Structure(s) 122 are provided within furnace 124. A plug 126, for example quartz filled with quartz wool, is provided near an end of the furnace as a heat shield. A door 128, preferably of quartz, is positioned at the furnace end that is in closest proximity to plug 126. Door 128 is substantially gas tight to seal in the environment. A cover 130, which may comprise aluminum for example, maybe positioned over and spaced apart from door 128 as a safety measure. An antenna 132 is positioned within the area defined by the inner surface of cover 130 to the outer surface of plug 126, to pick-up signals from structure(s) 122 cracking. In an exemplary embodiment, cover 130 is spaced about 7 inches from door 128, door 128 is spaced about 12 inches from plug 126, and plug 126 is spaced about 20 inches from structure(s) 122. Additional illustrative dimensions include, a 16 inch diameter furnace 124, ¼-½ inch thick door 128, ⅝ inch thick cover 130, and 8 inch thick plug 126.

Figure 12:
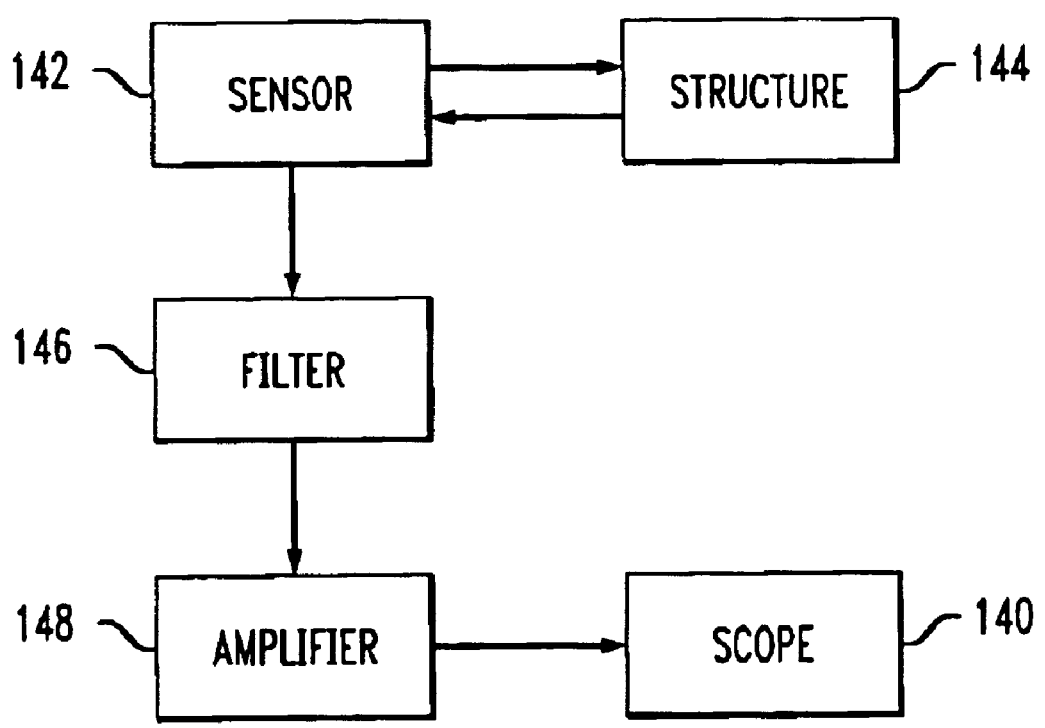
FIG. 12 depicts a block diagram of a crack detector according to an illustrative embodiment of the invention.

FIG. 12 depicts a block diagram of a crack detector according to an illustrative embodiment of the invention. Sensor 142 transmits a signal to, and receives a reflected signal from a structure 144. Sensor 142 may comprise a signal source, antenna(s) and mixer. The mixer output is preferably amplified and filtered. In the illustrative embodiment of the invention depicted in FIG. 12, the sensor output signal is filtered by band-pass filter 146 to remove, for example DC offset and high-frequency noise. The sensor output signal is amplified by amplifier 148 to optimize the signal for phase change monitoring. Filtering and amplification may be performed in any order, with filtering preferably being performed first.

An electronic scope 140 may be used to provide a visual display of the monitored shift produced by cracking. A Tectonic 601 digital scope was successfully used in experiments to demonstrate the feasibility of the crack detection technique.

The system may further include an automated, real-time computer threshold analysis that would provide notification of detected signal characteristic changes. Notification may be audible or visible.

Measurements may be performed by passing the electromagnetic or acoustic signal through a window. The window may be any material through which the signal may be transmitted and reflected sufficiently to detect signal characteristic shifts caused by cracking. A window with minimum attenuation will allow a sensor to operate outside a sample environment with sufficient sensitivity. High temperatures and flowing gases should cause no significant reflection or attenuation of the microwave signal, and thus should have little or no effect on measurements. An exemplary window material is quartz.

Cracking may produce signal characteristic shifts by one or more mechanisms. First is a shift produced by microscopic internal and/or external motion caused by the cracking body. Additionally, a shift caused by the radar passing through an interface of two or more media. For example, the signal may first impinge on a continuous material such as sol-gel, then after cracking, impinge a second material or combination of materials such as sol-gel/air/sol-gel. Furthermore, a signal characteristic shift may be produced by movement of a solvent or other fluid which may be present from a fabrication process or other source. For example, Doppler radar may pick up movement of solvent during a sol-gel drying process more readily than sol-gel tube movement itself.

The crack detection maybe performed over a wide range of temperatures. Illustrative temperature ranges include greater than about 300° F., about 300° F. to about 1500° F., and about 600° F. to about 1000° F. The latter temperatures are commonly found in sol-gel tube fabrication processes.

Embodiments of the crack detection method may be used to detect cracks of substantially any magnitude. Advantageously embodiments of the invention may be used to detect cracks causing microscopic motion. In an exemplary embodiment of the invention cracks of approximately 10 μm or greater are detected. In a further illustrative embodiment motion due to cracking is resolved on a scale of about 5 μm to about 1 mm, which is beneficial for applications such as sol-gel tube formation.

The invention further includes a method for silica structure fabrication process development. The method begins by providing and carrying out a sol-gel fabrication process. Cracks are detected in real time during the process, thereby isolating one or more process steps during which cracking occurs. The one or more process steps are adjusted until cracking is diminished or eliminated. Embodiments of the process development method include crack detection methods as described herein.

Figure 5:
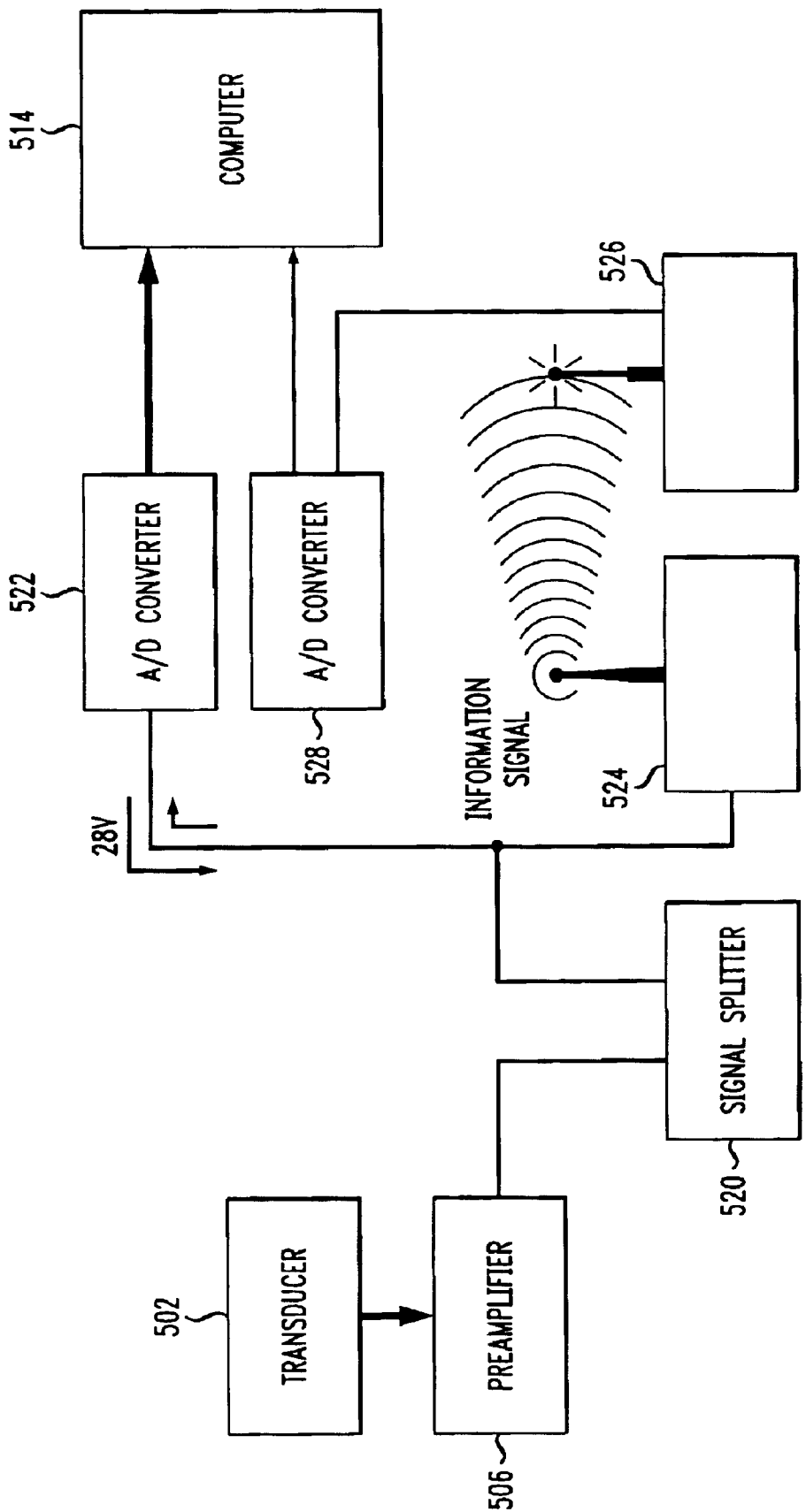
FIG. 5 depicts an acoustic emission signal measurement system having wireless data transmission according to an illustrative embodiment of the invention.

A wireless data transfer system may be used to transfer signals from a sensor, such as transducer 502, to a computer 514 as depicted in FIG. 5. Wireless data transmission allows system mobility, and may therefore increase system location possibilities. In an illustrative embodiment of the invention, a transducer 502 provides an information signal which is modulated to encode the information onto a carrier signal, thereby modifying the frequency of the carrier signal. An exemplary information signal frequency is greater than 50 kHz.

The illustrative embodiment of the invention depicted in FIG. 5 comprises a pre-amplifier 506 electrically connected to transducer 502 and receiving a signal therefrom. A signal splitter 520, such as an impedance matched BNC T, splits the signal from pre-amplifier 506. A first analog to digital converter 522 is electrically connected to signal splitter 520 and receives a portion of the split signal therefrom. A wireless transmitter 524 is electrically connected to signal splitter 520 and receives a second portion of the split signal therefrom. A wireless receiver 526 receives a signal from wireless transmitter 524. A second analog to digital converter 528 is electrically connected to receiver 526 and receives a signal therefrom. Computer 514 is electrically connected to first and second analog to digital converters 522 and 528. In an exemplary embodiment of the invention the wireless data transmission system may further comprise a repeater to re-amplify the signal prior to its input to computer 514. Re-amplification may take place before or after analog/digital conversion.

Figure 9A:
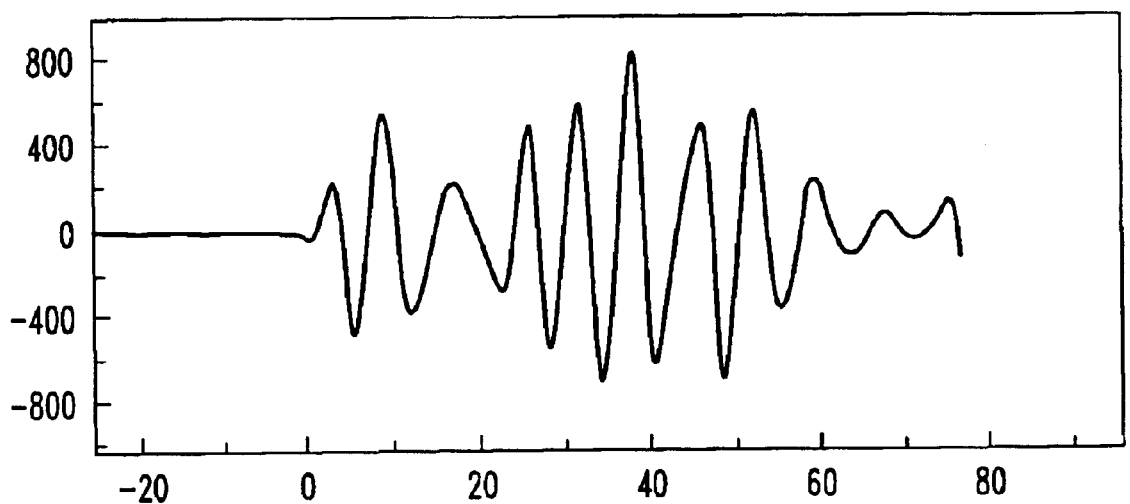
FIGS. 9a-b depict spectra for wire and wireless transmission, respectively.
Figure 9B:
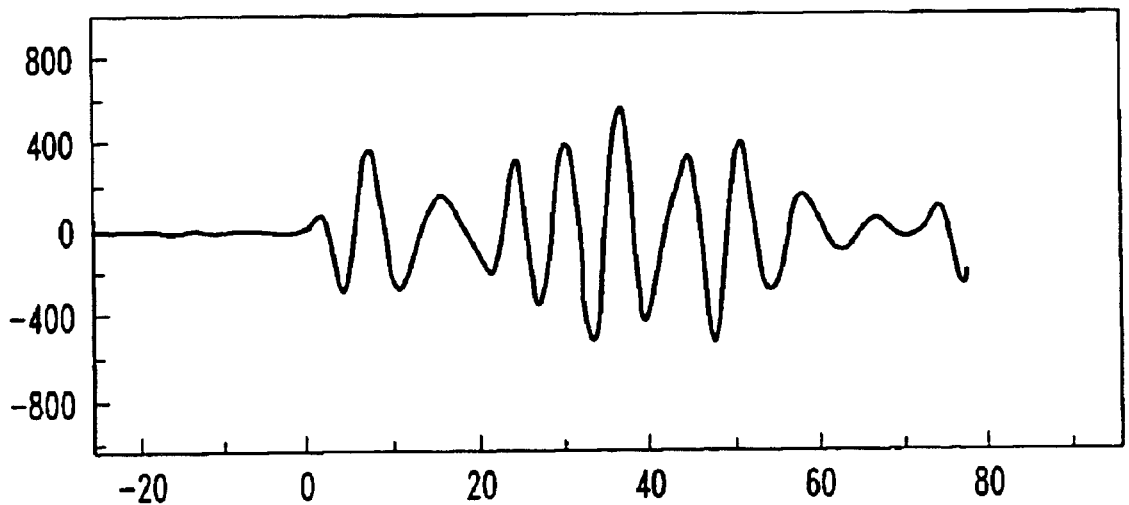

FIGS. 9a-b depict spectra for wire and wireless transmission, respectively. The spectra were produced by generating an ultrasonic signal of frequency on the order of 150 kHz by exciting a resonant transducer. The generated wave was amplified using a 40 dB gain pre-amplifier and the signal was split using an impedance matched BNC T connector. One arm of the split signal was fed directly to an analog/digital converter. The other arm of the split signal, the wireless signal, was fed to the input of a 2.4 Ghz wireless transmitter. The receiver was set to receive the data and send to a separate analog/digital converter. The oscilloscope was synchronized to collect data simultaneously when the resonance transducer was excited. A comparison of the spectra depicted in FIGS. 9a-b shows that substantially no signal distortion is observed during the wireless transmission. When the input impedance of the transmitted signal is matched with the output device from which the signal is originated, loss is at a minimum. A repeater can be used to re-amplify the signal to maintain the integrity of the original transmitted signal.

Embodiments of the invention include two measurement modes for monitoring cracks in silica structures, which may be used alone or in conjunction with one another. The modes are termed contact and non-contact. Both techniques have advantages and disadvantages and complement each other in a system where both can exist.

In an illustrative embodiment of the contact mode, a sensor, such as a transducer, is in contact with the silica structure. A gel coupling material is preferably applied at the sensor/structure interface to effectively extract the remitted signal. In the contact mode, the motion of the structure is followed by the sensor to maintain contact.

In an exemplary embodiment of the invention, the sensor maintains substantial contact with a silica tube while it is rotating, shrinking and translating. Pressure waves from the transducer, for example that which would embark from a piezoelectric crystal, are converted to electrical signals and are carried to the measurement system via electrical connectors. In an illustrative embodiment, the electrical connectors are a rotary-type to allow tube rotation with little or no adverse effects to the wiring.

Figure 6:
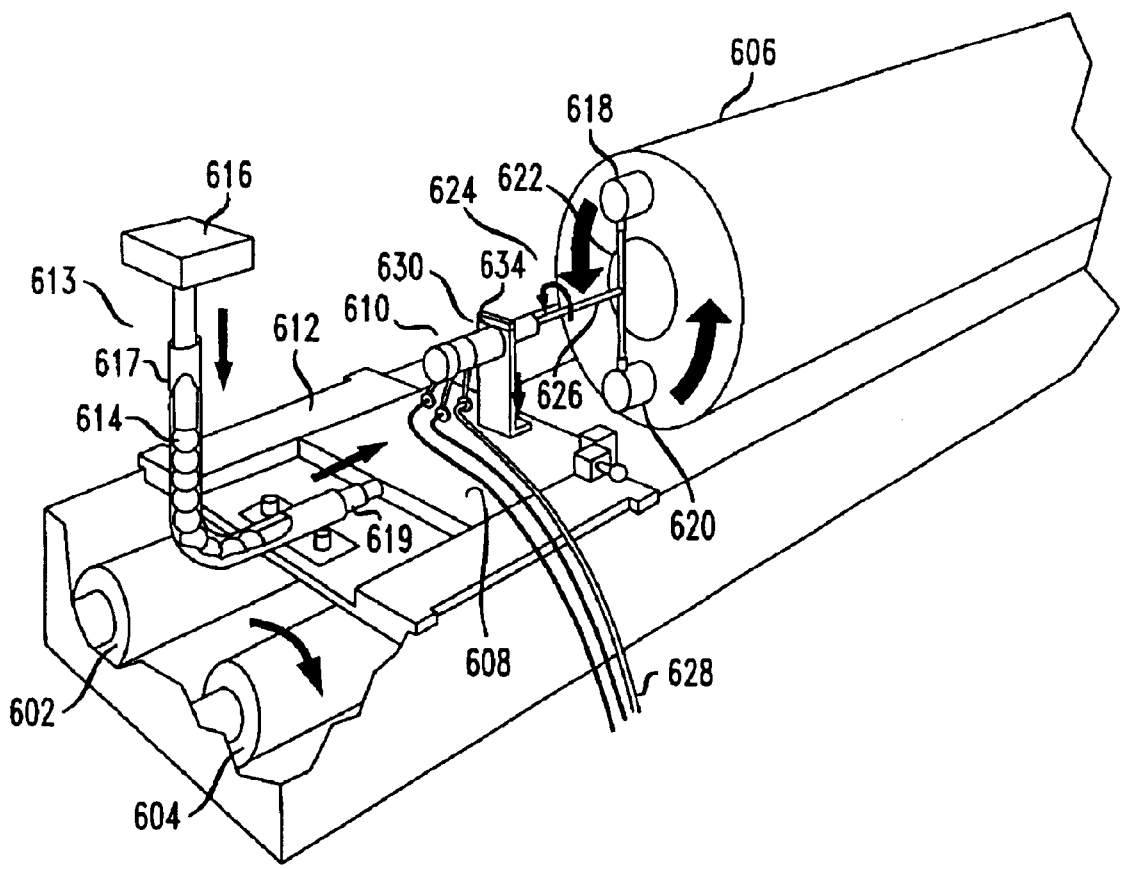
FIG. 6 depicts a transducer-follower system according to an illustrative embodiment of the inventive.

FIG. 6 is a conceptual design of a transducer-follower system, according to an illustrative embodiment on the invention. The system follows the structure as it undergoes different movements and physical changes imposed by drying dynamics. The crack-detection apparatus in FIG. 6 is shown as it maybe used, for example, during a sol-gel tube fabrication drying step. During drying, a sol-gel tube is rotated on a roller in a dryer to provide uniform drying. FIG. 6 includes a portion of a roller assembly that supports the sol-gel tube during the fabrication process drying step. Two rollers 602 and 604 are shown supporting sol-gel tube 606. The roller assembly is typically moved past several heater systems and is carried to the end of the dryer by a conveyor. The rate of drying is very slow. It may take 14 days for a tube to travel the length of a 100 foot long dryer.

The apparatus depicted in FIG. 6 further comprises a movable tray 608, which supports a transducer assembly 610. Tray 608 is mounted on a track 612 which is preferably substantially frictionless to allow for slidable movement in the X-direction (the direction toward or away from the gel structure) as the gel shrinks. A force-exerting assembly 613 provides substantially constant pressure of transducer assembly 610 against gel structure 606 and helps to maintain uniform translation in the X-direction. In an exemplary embodiment of the invention, force-exerting assembly 613 comprises a tubular structure 617 having a plurality of balls 614 therein. The balls maybe for example, stainless steel. Balls 614 are coupled to a weight block 616. Weight block 616 has at least a portion within a first end of tubular structure 617 and is in slidable relation thereto. Weight block 616 exerts a force on balls 614 causing them to move in a longitudinal direction within the tubular structure. A bar 619 has a portion within tubular structure 617 and is in slidable relation thereto. Bar 619 exerts pressure on tray 608 as it slides in the X-direction from the force exerted by weight block 616. In an exemplary embodiment of the invention, the total travel distance of bar 619 in the X-direction is greater than one-half the total expected length of gel shrinkage. In an illustrative embodiment, the travel distance is approximately six inches. Those skilled in the art will understand that other force-exerting assemblies maybe used that may produce the desired pressure, such as spring mechanisms.

To follow the rotational motion of tube 606 by the action of rollers 602 and 604, sensors 618 and 620, such as transducers, are mounted opposite from one another on a bar 622, which forms a T-assembly 624, by a drive shaft 626. In an exemplary embodiment, shaft 626 is a hollow tube, preferably stainless steel, into which transducer wires 628 are fed and are mounted to connector 630. Connector 630 is preferably a three-wire rotary electrical connector. A mercury contact, for example of a typical rotary connector, provides a desirable low impedance electrical connection and relative frictionless motion that may facilitate reliable operation. Although two transducers 618 and 620 are depicted in FIG. 6, only one transducer is needed to monitor the activity of the sol-gel tube. The purpose of the second transducer is to allow for axis symmetrical balancing of the pressure against the tube and may also serve as a spare transducer. Similarly, more than two transducers may be used. Balancing may be accomplished in any other manner that is compatible with the system and process, such as by weights. The pressure imposed by force-exerting assembly 613 should be sufficient to overcome slipping of transducers 618 and 620 against the sol-gel tube face, but not too high so as to move the rotating tube along the X-direction.

Tube 606 is likely to shrink in diameter during the fabrication process. This will cause the center of symmetry to be displaced. To overcome this change, drive shaft 626 may be supported in the horizontal position by a bracket 634 fitted with track 612 with a travel distance along track 612 sufficient to counteract movement from tube shrinkage. In an illustrative embodiment, the travel distance is about ½ inch. The travel distance is preferably in the range of about 45% to about 55% of the expected decrease in the tube diameter.

In a non-contact monitoring mode the sensor does not directly contact the silica structure. One or more media exist between the sensor and silica structure through which electromagnetic or acoustic waves may be transmitted.

Figure 7:
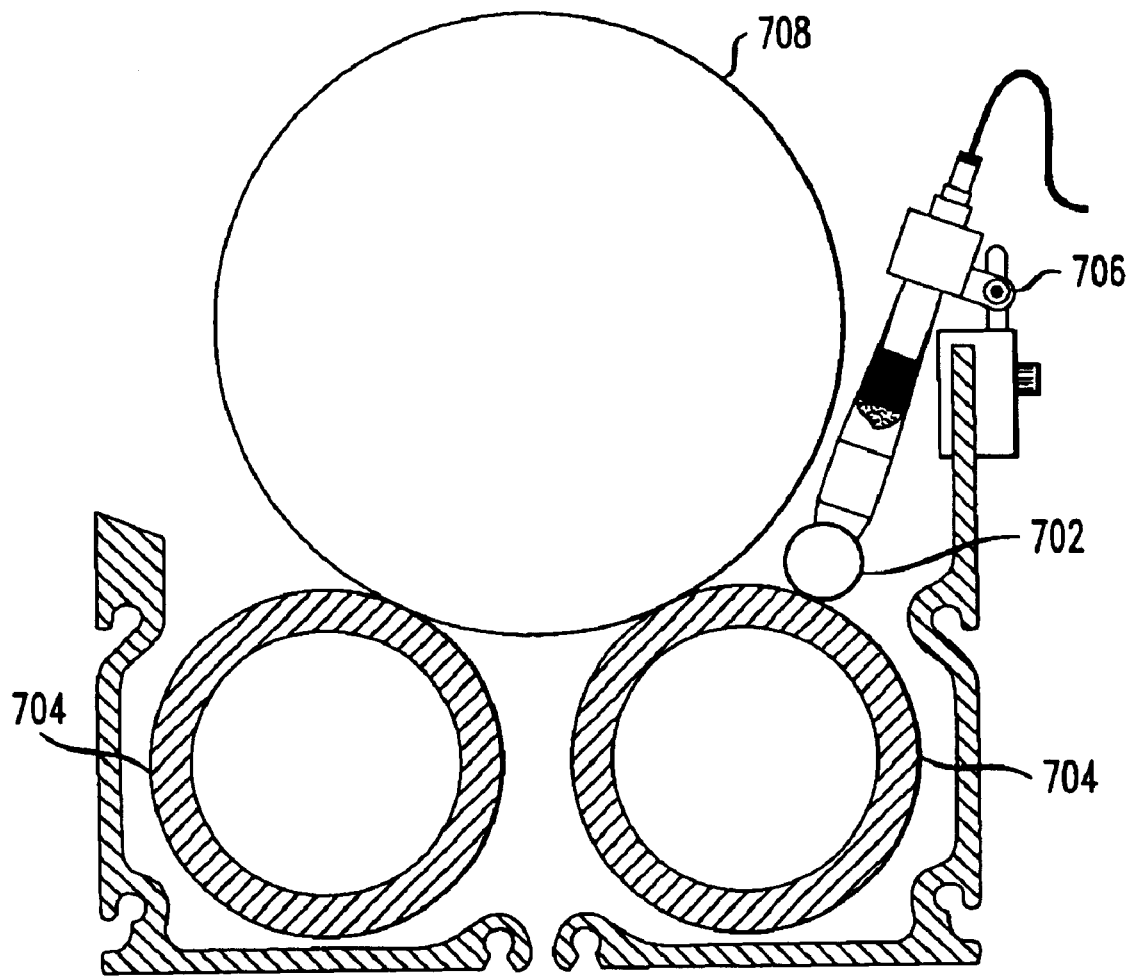
FIG. 7 depicts a non-contact acoustic emission signal measurement system according to an illustrative embodiment of the invention.

An illustrative embodiment of a non-contact mode monitoring device is depicted in FIG. 7. Rollers 704 support structure 708. In the illustrative configuration depicted in FIG. 7, structure 708 is positioned longitudinally and proximate to a crevice formed between adjacent rollers 704. A rolling sensor 702 is positioned against a roller 704. When the structure cracks, the acoustic or electromagnetic emission signal is transferred to roller 704 by the tube's proximity to the roller. The signal is propagated through roller 704, to the sensor 702. A pressure-exerting mechanism 706 causes sensor 702 to remain in contact with roller 704. In an exemplary embodiment, the mechanism is a spring that provides sensor 702 with pressure against roller 704. Although a significant amount of energy may be lost at the tube/roller and roller/sensor interfaces through the coupling of the wave between different media of different impedances, a significant amount of signal may still be detected. The roller may comprise material other than stainless steel that will transfer the acoustic or electromagnetic emission signal to the sensor, and is compatible with the apparatus and process in which the apparatus is used.

Figure 8A:
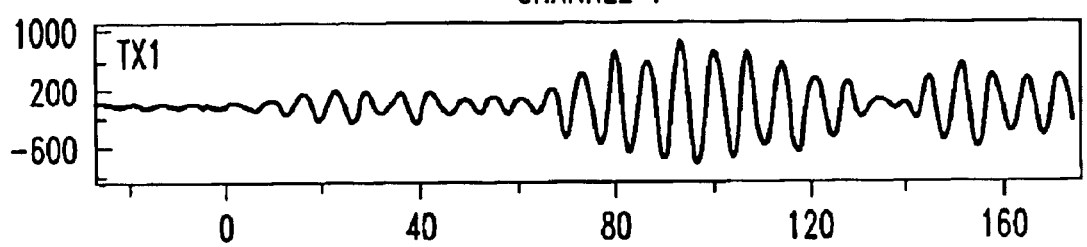
FIGS. 8a-c depict comparison spectra for contact and non-contact modes.
Figure 8B:
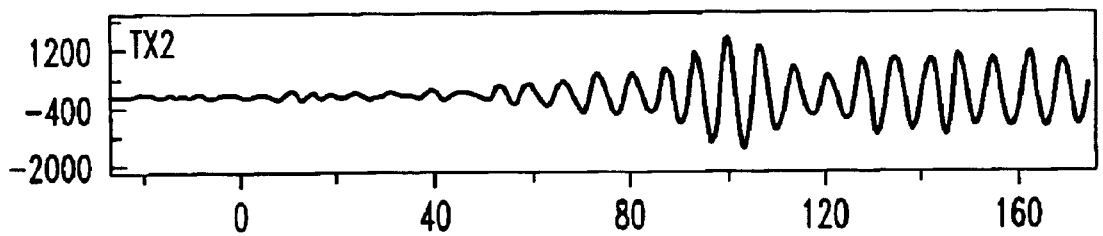
Figure 8C:
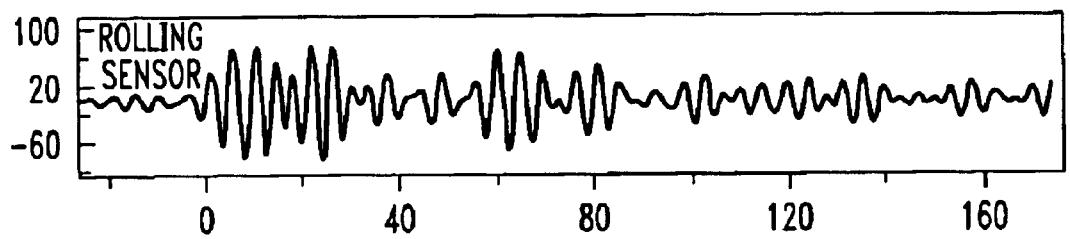

FIGS. 8a-c are comparison spectra depicting changes in voltage over time obtained for contact and non-contact modes. FIGS. 8a and b depict spectra generated by two transducers Tx-1 and Tx-2, such as transducers 618, 620, in the contact mode set-up shown in FIG. 6. FIG. 8c depicts a spectrum generated by a rolling sensor, such as sensor 702, in a contact mode configured such as is shown in FIG. 7. Although the detection sensitivity for the non-contact mode is lower by at least an order of magnitude than that of the contact mode, it is sufficient to be able to distinguish a tube crack from noise interference.

TABLE 1

Signal Response Characteristics

| Sensor | Amplitude (mV) | Time-of-Flight ($\mu$sec) | Resonant Frequency Range (kHz) |
|---|---|---|---|
| Tx-1 | 900 | 93 | 140–180 |
| Tx-2 | 1460 | 100 | 140–150 |
| RS | 70 | 10.5 | 200–250 |

Experimental results are outlined in Table 1. The time-of-flight for both transducers, Tx-1 and Tx-2, in the contact mode are substantially the same, indicating that the crack is originated from near the middle of the tube. The time-of-flight from the rolling sensor, RS, is much shorter because of closer distance to the crack source. The measured resonance frequency is dependent on the commercial transducers used. The difference in amplitude of Tx-1 and Tx-2 may result from the transducer efficiency and how well they are coupled to the tube. The transducers should maintain similar contact for comparison. As is seen, the intensity of the signal detected from the non-contact mode is at least an order of magnitude lower than that from the contact mode but is sufficient to be able to identify whether a crack has occurred.

When using the non-contact mode for detecting acoustic emission signals with resonant frequency transducers above about 100 kHz together with a threshold-arming technique, which uses the highest signal in the waveform, acoustic emission is a powerful technique for monitoring tube cracks. Sol-gel crack-detection efficiency may be maximized by determining the time period in which cracks are most likely to occur. The drying of sol-gel involves a complex interaction of three independent kinetic processes, evaporation, viscous deformation of the solid phase and flow of liquid in the pores. A pressure gradient developed in the pore of the gel leads to drying stress which is related to drying rate, size and properties of the gel. As the gel shrinks, the tension in the pores increases and the vapor pressure of the liquid decreases according to $$P_v = p^o \exp(-PV_m/R_g T) \qquad (7)$$

where $P_v$ is the vapor pressure of the liquid, $p^o$ is the vapor pressure of the gas, $R_g$ is the universal gas constant, T is the temperature of the liquid(?), $V_m$ is the molar volume of the liquid and P is the tensile stress in the liquid. During the first few hours of the drying, during the constant rate period in which the decrease in volume of the gel is equal to the volume of the gel loss by evaporation, it is not as critical to monitor for cracks by the acoustic emission system. First, cracking of the gel structure is very unlikely at this stage since the evaporation rate is similar to that of the bulk liquid, so the vapor-pressure reduction is insignificant. Second, the gel network at this stage is still very wet and the absorption of sound waves in such a highly damped medium is so high that the signal is unlikely to reach the detector. As drying proceeds, the network becomes increasingly stiff as the gel shrinks because new bonds are forming, the porosity is decreasing and the tension in the liquid rises accordingly. At some point, referred to as the critical point, shrinkage will stop. At this point, cracking is most likely to occur. The greatest number of acoustic events are likely to be observed after the gel shrinkage has stopped. Accordingly, it is most advantageous to monitor cracks at this point. Embodiments of the invention allow monitoring at the most critical points in processes and during other periods in which cracks may occur, by providing contact monitoring, non-contact monitoring or a combination of the two modes.

While the invention has been described by illustrative embodiments, additional advantages and modifications will occur to those skilled in the art. Therefore, the invention in its broader aspects is not limited to specific details shown and described herein. Modifications, for example, to the sensor type and wave signature detected, may be made without departing from the spirit and scope of the invention. Accordingly, it is intended that the invention not be limited to the specific illustrative embodiments but be interpreted within the full spirit and scope of the appended claims and their equivalents.

Claimed is:

1. A method for monitoring cracks in a silica structure comprising:

sensing a wave signature of a crack in the silica structure.

2. The crack monitoring method of claim 1, wherein the structure comprises sol-gel.

3. The crack monitoring method of claim 1, wherein the structure comprises a tubular configuration.

4. The crack monitoring method of claim 1, wherein the wave signature is characterized by the presence of electromagnetic energy.

5. The crack monitoring method of claim 1, wherein the wave signature is characterized by the presence of acoustic energy.

6. The crack monitoring method of claim 5 wherein the step of sensing comprises detecting acoustic energy by a contact detection system.

7. The crack monitoring method of claim 5 wherein the step of sensing comprises detecting acoustic energy by a non-contact detection system.

8. The crack monitoring method of claim 5 wherein the step of sensing comprises detecting acoustic energy by a combination of a non-contact detection system and a contact detection system.

9. The crack monitoring method of claim 1, wherein the step of sensing comprises detecting emissions characterized by the wave signature.

10. The crack monitoring method of claim 1, wherein the step of sensing comprises detecting reflected signals characterized by the wave signature.

11. The crack monitoring method of claim 10, wherein detecting reflections is performed by Doppler radar.

12. The crack monitoring method of claim 1 wherein the wave signature is transmitted from a sensor to a computer by a wireless data transmission system.

13. A silica structure fabrication process development method comprising:

monitoring cracks in the silica structure by sensing a wave signature of a crack in the structure to isolate one or more process steps in which cracking has occurred;

adjusting process parameters in the one or more isolated steps to diminish or eliminate cracking.

* * * * *